US006246315B1

(12) United States Patent
Thomas et al.

(10) Patent No.: US 6,246,315 B1
(45) Date of Patent: Jun. 12, 2001

(54) VEHICLE ALARM

(76) Inventors: Keith A. Thomas, 1509 W. 20th Park Pl.; Timothy A. Kearnes, 951 Whildin, both of Emporia, KS (US) 66801; Bruce R. Davis, 519 W. Lincoln, Madison, KS (US) 66860

( * ) Notice: Subject to any disclaimer, the term of this patent is extended or adjusted under 35 U.S.C. 154(b) by 0 days.

(21) Appl. No.: 09/121,231

(22) Filed: Jul. 23, 1998

(51) Int. Cl.[7] ................................................. B60R 25/10
(52) U.S. Cl. ...................... 340/426; 307/10.2; 340/539; 340/825.69
(58) Field of Search ................................. 340/426, 539, 340/825.69, 825.72; 307/10.2; 180/287

(56) References Cited

U.S. PATENT DOCUMENTS

| | | | | |
|---|---|---|---|---|
| 5,117,217 | * | 5/1992 | Nykerk | 340/426 |
| 5,192,042 | * | 3/1993 | Wotring et al. | 248/176 |
| 5,216,407 | * | 6/1993 | Hwang | 340/426 |
| 5,473,305 | * | 12/1995 | Hwang | 340/426 |
| 5,543,776 | * | 8/1996 | L'Esperance et al. | 340/426 |
| 5,677,664 | * | 10/1997 | Sawinski | 340/426 |
| 5,739,747 | * | 4/1998 | Flick | 340/426 |
| 5,870,020 | * | 2/1999 | Harrison, Jr. | 340/426 |
| 5,905,432 | * | 5/1999 | Greene | 340/426 |

* cited by examiner

*Primary Examiner*—Brent A. Swarthout
(74) *Attorney, Agent, or Firm*—Shook, Hardy & Bacon LLP

(57) ABSTRACT

A vehicle alarm system (20) includes an alert transmitter (32), alert receiver (44), alert device (46), arming unit (42), alarm unit (28), and alarm device (30). The alert transmitter (32), alert receiver (44), and alert device (46) are added to the arming unit (42), alarm unit (28), and alarm device (30) of an existing vehicle alarm system to notify a vehicle owner that an alarm condition has occurred when the vehicle owner is beyond audible range of the alarm device (30). An arming unit power source (52) and arming unit controls (54,56) are used to power and control the alert receiver (44) and alert device (46), and the arming unit (42) is coupled with an alert housing (50) to provide a unitary remote assembly (24).

6 Claims, 2 Drawing Sheets

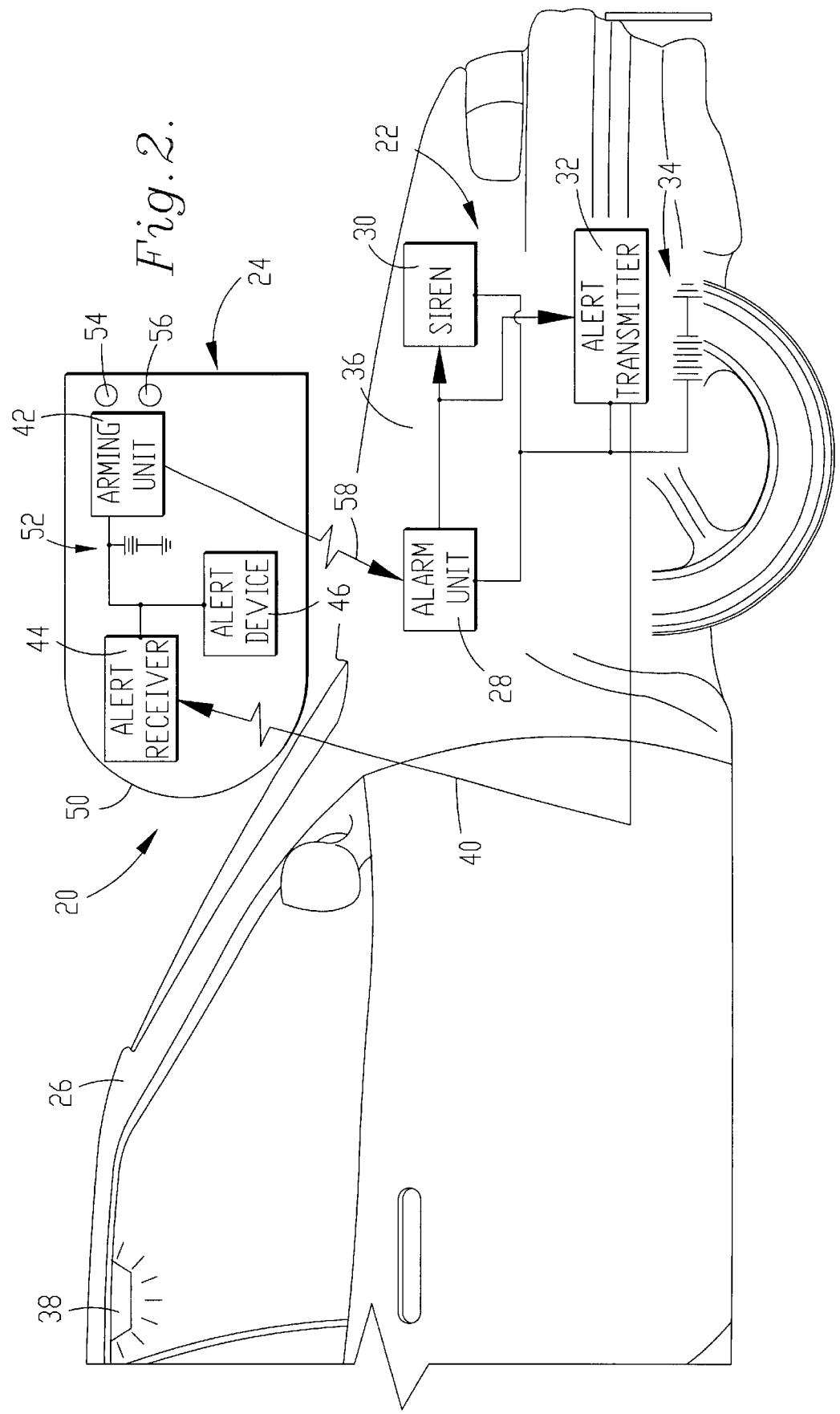

VEHICLE ALARM

BACKGROUND OF THE INVENTION

1. Field of the Invention

This invention relates to vehicle alarm systems and, more particularly, components added to a currently installed vehicle alarm system. In preferred forms, a self-contained signaling transmitter is attached to the current security device installed in the vehicle and an RF receiver is attached to the current remote arming unit to notify a vehicle owner that the vehicle alarm system has been activated.

2. Description of Prior Art

With automobile thefts, break-ins, and vandalism all on the rise, increasing numbers of motorists are utilizing vehicle alarm systems to protect their vehicles. To encourage their use, some automobile insurance companies offer discounts on automobile insurance when vehicle alarm systems are installed.

A typical vehicle alarm system, illustrated in prior art FIG. 1, typically consists of an alarm unit and a remote arming unit. The alarm unit is mounted in the vehicle and powered by the vehicle battery. The alarm unit is operatively connected with a siren or the vehicle's horn, so that when an intruder is detected, the siren sounds an alarm. Typically, the siren is also powered by the vehicle battery, and the siren requires a significant amount of power from the vehicle battery. The remote arming unit has its own power source and a pair of buttons which operate to selectively activate and deactivate the alarm unit.

These conventional vehicle alarm systems perform their intended function of scaring away intruders a majority of the time. However, there are occasions when the vehicle is left in remote locations where no one is around to hear the alarm leaving the intruder free to continue illegal activity, and even if the intruder flees, the alarm continues to sound unheard perhaps for many hours. In this situation the alarm may not perform its intended function of scaring the intruder away, and because of the power consumed by the siren, the owner may return to the vehicle only to find that it will not start because the siren has depleted the vehicle battery's power.

Occasionally, vehicle alarm systems are inadvertently activated, and unless the owner is able to hear the alarm and deactivates it, the alarm will continue to sound. This situation is extremely annoying to anyone around the vehicle and again, can result in depleting the vehicle battery's power. Further, when an alarm is sounding in a parking lot full of vehicles, it is difficult for owners to discern whether or not it is their vehicle that is responsible. The responsible owner may continue with planned activities assuming that it is someone else's vehicle. Again, surrounding people are annoyed and there is a risk that the vehicle battery will run down.

Some systems also provide a transmitter in the vehicle and a remote pager carried by the vehicle owner. The transmitter sends a signal to the pager to notify the owner that the vehicle alarm has been activated. This arrangement is inconvenient because the vehicle owner must carry a separate arming unit and pager. Further, to upgrade existing vehicle alarm systems to include a remote signaling feature requires the installation of an entirely new paging unit that interfaces with the current main unit. Because of the cost of such upgrade, vehicle owners are discouraged from using a remote signaling feature if they already have a vehicle alarm system.

SUMMARY OF THE INVENTION

The present invention solves the problems mentioned above and provides a distinct advance in the state of the art. In particular, the invention is directed to a vehicle alarm system with an alert transmitter, alert receiver, and alert device which can be installed in a vehicle as an original alarm system or added to an existing vehicle alarm system. Upon occurrence of an alarm condition, the alert transmitter sends a signal to the alert receiver which in turn sends a signal to the alert device. When the signal is received by the alert device, the alert device operates to notify the responsible party of the alarm condition.

A preferred vehicle alarm system includes an arming unit with arming unit controls, an alarm unit, and an alarm device such as the vehicle horn. The alert transmitter is connected to the alarm unit to receive an alarm signal from the alarm unit, and when the alarm signal is received, the alert transmitter sends a 900 MHZ, wireless alert signal to the alert receiver which is preferably powered by an arming unit power source. The alert device, which is also powered by the arming unit power source, receives an alert activation signal from the alert receiver and either beeps or vibrates. The alert receiver and alert device are held in a wireless and portable alert housing, and the alert device is controlled by the arming unit controls. Alternatively, the alert components have their own alert power source and alert controls.

The invention is further directed to a method for modifying an existing vehicle alarm system to include an alarm condition remote notification feature. The method includes installing the alert transmitter in the vehicle, and coupling the arming unit with the alert housing.

A preferred method includes connecting the alert receiver and alert device to the arming unit power source and arming unit controls, so that the alert receiver and alert device are powered and controlled thereby. The arming unit is inserted into the alert housing, so that the arming unit controls are accessible for use. The alert transmitter is operatively connected to the alarm unit to receive the alarm signal from the alarm unit.

BRIEF DESCRIPTION OF THE DRAWINGS

FIG. 2 is a schematic diagram of a vehicle alarm system having an alarm condition remote notification feature according to the present invention.

DETAILED DESCRIPTION OF THE PREFERRED EMBODIMENTS

Figure 1:
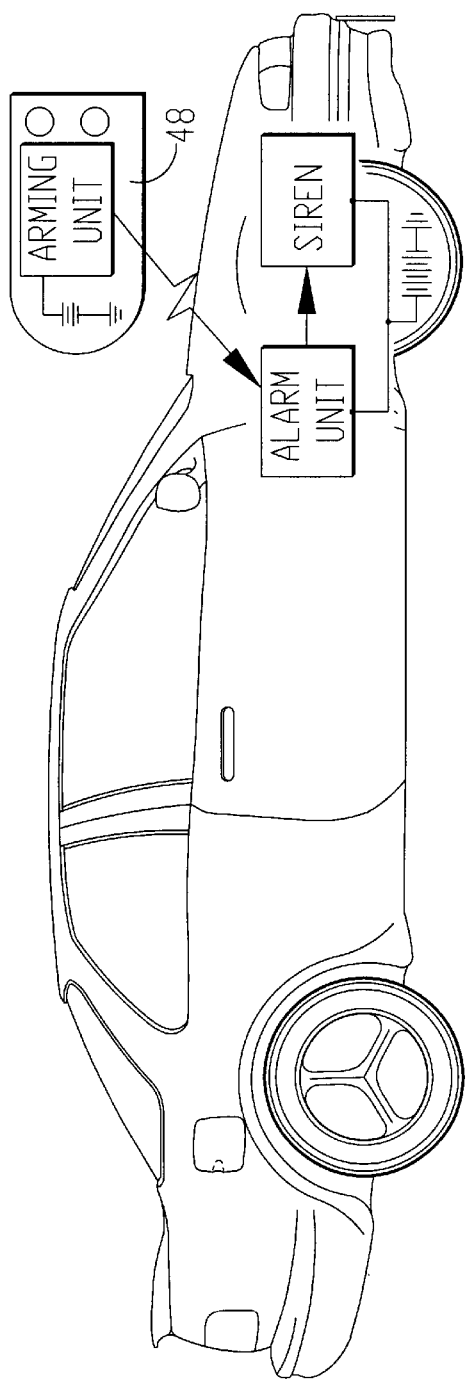
FIG. 1 is a schematic diagram of a prior art vehicle alarm system.

FIG. 2 illustrates a preferred vehicle alarm system 20 in accordance with the present invention. The alarm system 20 includes a vehicle assembly 22 and a portable, remote assembly 24. The vehicle assembly 22 is preferably installed in a vehicle 26, and the remote assembly 24 is preferably unitary and carried with the vehicle operator or other responsible entity.

The vehicle assembly 22 comprises an on-site assembly including an alarm unit 28, alarm device 30, alert transmitter 32, and at least one alarm power source 34. The components of the on-site assembly are preferably installed on the vehicle in a protected area such as under the vehicle hood 36.

The alarm unit 28 is a substantially conventional unit provided with common vehicle alarm systems. The current alarm unit is capable of determining the occurrence of an alarm condition and is operative to send an alarm signal to the installed alarm device 30 or the add-on alert transmitter 32 as appropriate when an alarm condition occurs. The alarm unit is also provided with an antenna to aid in receiving a wireless arming signal from the remote assembly 24. When a common vehicle alarm system is not utilized, the alarm unit comprises an appropriate vehicle component such as a dome light 38 or an operatively installed low voltage sensor interfaced with the add-on alert transmitter 32.

The alarm device 30 preferably comprises the vehicle horn although a separate siren can also be provided. The alarm device 30 is operatively connected to the alarm unit to receive the alarm signal from the alarm unit, and the alarm device operates to emit an audible alarm upon receipt of the alarm signal. When an existing alarm system is adapted to include the remote signaling feature, the currently installed alarm device 30 can be disconnected from the alarm unit 28 to reduce battery consumption and avoid the noise emitted from the alarm device 30.

The alert transmitter 32 is operatively connected to the alarm unit 28 to receive the alarm signal from the alarm unit. The alert transmitter is preferably a self contained transmitter operable to send a wireless, 900 MHZ alert signal 40 to the remote assembly 24 upon receipt of the alarm signal from the alarm unit. The self-contained alert transmitter includes an antenna, an alert transmitter power source, and a wiring harness for connection to an existing vehicle alarm system.

The alarm power source 34 preferably comprises the vehicle battery. The battery 34 is electrically connected to the alarm unit 28 and the alarm device 30 providing power thereto. Though the alert transmitter 32 preferably has its own power source, it can also be powered by the vehicle battery 34.

The remote assembly 24, such as a key ring which accompanies the vehicle operator or other responsible entity, includes an arming unit 42, alert receiver 44, and alert device 46. The arming unit 42 is initially held in an arming unit housing 48 (FIG. 1), and the alert receiver 44 and alert device 46 are held in a remote alert housing 50.

The arming unit 42 is electrically connected to and powered by an arming unit power source 52, and the arming unit 42 is controlled by arming unit controls 54,56. The arming unit controls comprise an activation button 54 and a deactivation button 56. The controls 54, 56 are externally accessible for selective activation of the alarm unit by the arming unit. Specifically, the arming unit is operably to send a wireless radio frequency arming signal 58 to the alarm unit 28 to selectively arm and disarm the alarm unit. The arming unit 42, similar to the alarm unit, is a substantially conventional unit provided with common vehicle alarm systems and has an antenna to improve transmission. The arming unit, arming unit power source 52, and controls 54, 56 are preferably removed from the arming unit housing 48 and inserted in the alert housing 50 with the controls 54, 56 still accessible for operation.

The alert receiver 44, which also has an antenna, is operative to receive the 900 MHZ wireless alert signal 40 from the alert transmitter 32, and the alert receiver 44 is also operative to send an alert activation signal to the alert device 46 in response to the wireless alert signal 40. The alert receiver 44 is preferably connected to the arming unit power source 52 and is powered thereby.

The alert device 46 is operatively connected to the alert receiver to receive the alert activation signal therefrom, and upon receipt of the alert activation signal, the alert device is further operable to notify the vehicle operator or responsible entity that an alarm condition has occurred. To notify the operator, the alert device generates a user signal which is detectable by the operator. Preferably, the alert device 46 is provided in the form of either a beeper or a vibrator. As shown in the preferred embodiment of FIG. 2, the alert device, like the alert receiver 44, is preferably powered by the arming unit power source 52. Further, the alert device is operatively connected to the arming unit controls 54, 56 to be selectively activated and deactivated thereby.

The alert housing 50 is preferably larger that the arming unit housing 48, and the alert housing has an opening to receive the arming unit 42 therein. The alert housing 50 and the arming unit 42 are coupled together preferably, so that the arming unit is inserted into the opening of the alert housing 50 with the arming unit controls 54, 56 still externally accessible for use.

Figure 3:
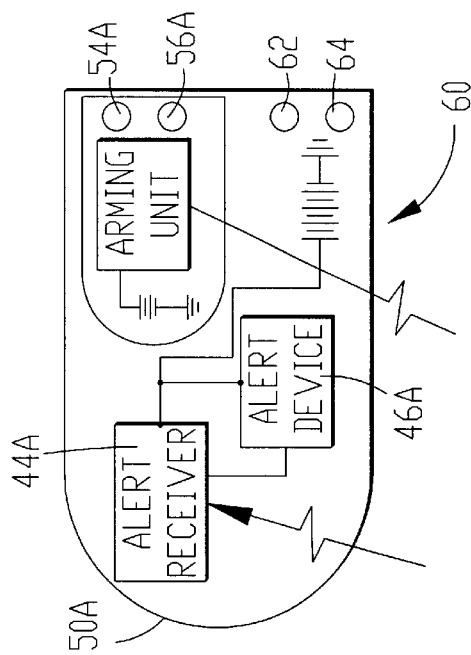
FIG. 3 is a schematic diagram of an alternate embodiment of a unitary, remote assembly used in a vehicle alarm system having the alarm condition remote notification feature according to the present invention.

In the alternate embodiment illustrated in FIG. 3, in which elements similar to those already described have been given the corresponding reference numeral with the distinguishing suffix A added thereto, a separate alert power source 60 is provided in the alert housing 50A. Both the alert device 46A and the alert receiver 44A are powered by the alert power source 60. Additionally, alert controls 62, 64 are provided. A deactivation button 62 operates to deactivate the alert device 46A, and a notification selection button 64 operates to selectively switch the alert device between beeping and vibrating modes. Additionally, other controls, such as door locks and ignition, can be provided in the combined housings. Because the controls and power source are separate, the entire arming unit housing 48A is coupled with the alert housing 50A. Preferably, the arming unit housing 48A is inserted into the alert housing 50A with the arming unit controls 54A, 56A accessible for selective operation.

In operation, the vehicle owner activates the alarm unit 28 by depressing the activation button 54. When the activation button is depressed, the arming unit 42 sends the wireless arming signal to the alarm unit 38 thereby activating the alarm unit. When an alarm condition occurs, such as the dome light 38 turning on, the alarm unit simultaneously sends the alarm signal to the alarm device 30 and the alert transmitter 32. In response to the alarm signal, the alarm device emits an audible alarm, and the alert transmitter sends the wireless alert signal 40 which is received by the alert receiver 44.

Immediately upon receipt of the wireless alert signal by the alert receiver, which is located with the responsible entity, the alert receiver transmits an alert activation signal to the alert device 46 which begins to beep or vibrate. Thus, the present invention operates to notify the responsible entity, even when that entity cannot hear the audible alarm device, that an alarm condition has occurred and that investigation is required.

After notification of the alarm condition, the vehicle owner depresses the deactivation button 56 to shut off the alert device. After the responsible entity returns to the vehicle, the deactivation button 56 is depressed again to shut off the alarm device 30. In the embodiment of FIG. 3, the deactivation buttons 56, 64 are depressed when appropriate to shutoff the alert device first and then the alarm device. Because the vehicle owner is immediately summoned to the vehicle, there is no chance for the vehicle battery to run down or for an intruder to continue illegal activities without being identified.

It will be appreciated that the present invention can be incorporated as part of the original manufacture. For example, the unit could be incorporated as part of the vehicle during manufacture or incorporated as an integral part of an after-market alarm system.

Those skilled in the art will appreciate that the present invention encompasses many variations in the preferred embodiments described herein. Having thus described those embodiments, the following is claimed as new and desired to be secured by Letters Patent:

We claim:

1. An after-market vehicular alarm system for upgrading an existing vehicular alarm system having an on-vehicle alarm unit, said after-market alarm system comprising:

a portable arming unit having an arming unit housing with arming unit controls accessible thereon and a power source;

a portable alert unit having an alert receiver and an alert device, wherein said alert device is connected to said alert receiver, said alert receiver and said alert device located in a portable alert unit housing, wherein said alert unit housing has an opening into which said arming unit housing is installed so that said arming unit and said alert unit are coupled together such that said arming unit controls remain accessible at an exterior of said combined housings; and said alert receiver and said alert device are electrically connected to and powered by said power source of said arming unit when said arming unit housing is installed in said alert unit housing opening; and an on-vehicle alert transmitter, connected to said alarm unit for transmitting a wireless signal to said alert receiver when said alarm unit is triggered, wherein said alert receiver receives said wirelessly transmitted signal from said alert transmitter and activates said alert device.

2. The after-market alarm upgrade system as recited in claim 1, wherein said wireless signal transmission is a radio frequency signal.

3. The after-market alarm upgrade system as recited in claim 2, wherein said radio frequency is about 900 MHz.

4. The after-market alarm upgrade system as recited in claim 1, wherein said alert device comprises a beeper.

5. The after-market alarm upgrade system as recited in claim 1, wherein said alert device comprises a pager.

6. The after-market alarm upgrade system as recited in claim 1, wherein said alert device comprises a vibrator.

* * * * *